United States Patent
Inn et al.

(10) Patent No.: US 6,972,974 B2
(45) Date of Patent: Dec. 6, 2005

(54) COMPENSATOR TO ACHIEVE CONSTANT BANDWIDTH IN A SWITCHING REGULATOR

(75) Inventors: Bruce L. Inn, San Jose, CA (US); Chuck Vinn, Milpitas, CA (US)

(73) Assignee: Micrel, Inc., San Jose, CA (US)

( * ) Notice: Subject to any disclaimer, the term of this patent is extended or adjusted under 35 U.S.C. 154(b) by 104 days.

(21) Appl. No.: 10/652,347

(22) Filed: Aug. 29, 2003

(65) Prior Publication Data

US 2005/0046401 A1    Mar. 3, 2005

(51) Int. Cl.[7] .............................................. H02M 5/42
(52) U.S. Cl. .......................... 363/89; 363/80; 363/97; 323/285
(58) Field of Search ................ 323/282, 283, 323/284, 285, 286, 288, 222, 271; 363/16–20, 363/97, 79–89, 44, 134, 127

(56) References Cited

U.S. PATENT DOCUMENTS 6,583,609 B1 * 6/2003 Pardoen ...................... 323/283

6,819,011 B2 * 11/2004 Kernahan et al. ............. 307/35

OTHER PUBLICATIONS

"Dual Mobile-Friendly PWM Controller with DDR Memory Option", Intersil Data Sheet, Jan. 2002, pp. 1-18.

* cited by examiner

Primary Examiner—Rajnikant B. Patel
(74) Attorney, Agent, or Firm—Carmen C. Cook; Patent Law Group LLP

(57) ABSTRACT

A switching regulator includes a compensation circuit for applying a scaling factor to the loop gain of the feedback control loop of the regulator. In operation, the loop gain of the feedback control loop has a dependency on the input and output voltages of the switching regulator. The compensation circuit applies a function as the scaling factor where the function is a reciprocal function of the loop gain dependency on the input voltage and output voltage. In one embodiment, the loop gain has a dependency on the ratio $V_{IN}/V_{OUT}$ and a scaling factor having a value indicative of the ratio $V_{OUT}/V_{IN}$ is applied by the compensation circuit. In one embodiment, the compensation circuit is coupled in series with the output circuit of an error amplifier in the feedback control loop of the regulator. In another embodiment, the compensation circuit is subsumed within the circuitry of the error amplifier.

21 Claims, 2 Drawing Sheets

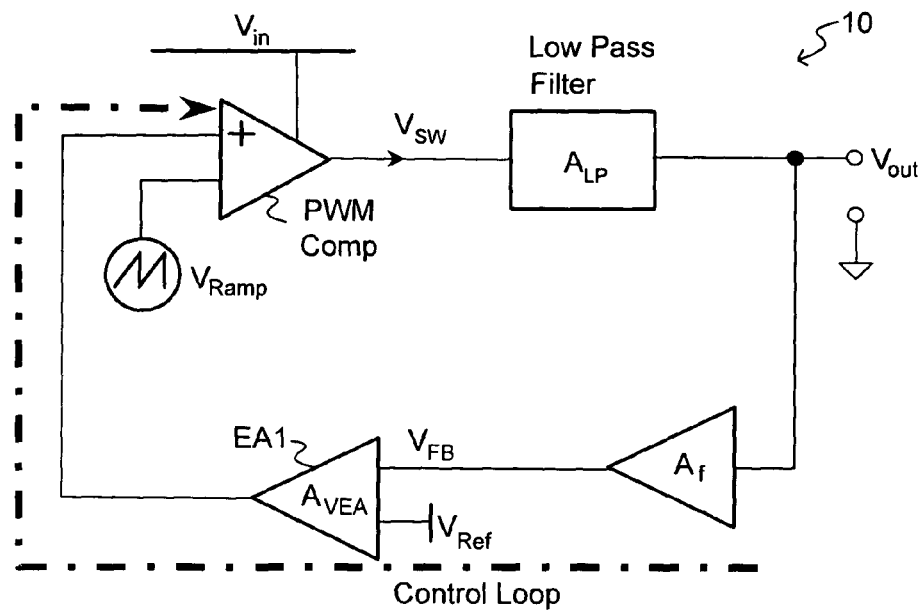
Figure 1 *(Prior Art)*
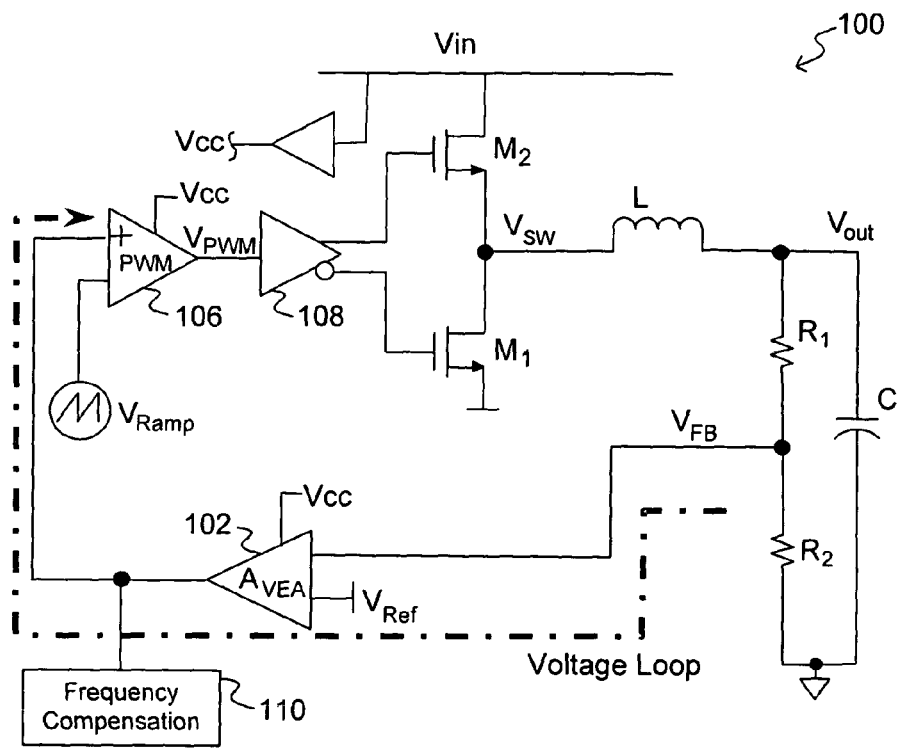
Figure 2

COMPENSATOR TO ACHIEVE CONSTANT BANDWIDTH IN A SWITCHING REGULATOR

FIELD OF THE INVENTION

The invention relates to switching regulators and, in particular, to a switching regulator including compensation to improve the transient response and achieve a constant bandwidth.

DESCRIPTION OF THE RELATED ART

A switching regulator, also referred to as a switching mode power supply, provides power supply function through low loss components such as capacitors, inductors, and transformers, and power switches that are turned on and off to transfer energy from the input to the output in discrete packets. A feedback control circuit is used to regulate the energy transfer to maintain a constant output voltage within certain load limits of the circuit.

A switching regulator can be configured to step up the input voltage or step down the input voltage or both. Specifically, a buck switching regulator steps down the input voltage while a boost switching regulator steps up the input voltage. A buck-boost switching regulator provides both step-up and step-down functions.

A problem faced by most types of switching regulators is sub-optimal transient response over most combinations of input and output voltages. During regulator operation, when the load condition changes, the regulator has to respond accordingly to set the inductor current or the duty cycle in order to maintain the regulated output voltage. In most switching regulator topology, the loop gain of the feedback system of the switching regulator is dependent at least on the input voltage. Thus, not only does the transient response of the switching regulator vary with the input voltage, the loop gain also tends to become very low when the switching regulator is operated at low input voltages.

FIG. 1 is a simplified functional diagram of a switching regulator. The gain of the control loop is a function of the feedback factor $A_f$, the input voltage $V_{IN}$ and other factors, such as the output voltage $V_{OUT}$ or the low pass filter gain $A_{LP}$ depending on the implementation details of the particular switching regulator of interest. The loop gain of the control loop of switching regulator 10 of FIG. 1 can be analyzed by breaking the loop at the output voltage $V_{OUT}$ node. The loop gain $A_{loop}$ can be expressed as:

$$A_{loop} = A_f A_{VEA} V_{in} \quad (1)$$

where $A_f$ is a feedback factor and $A_{VEA}$ is the gain of the error amplifier EA1.

The feedback factor $A_f$ is the ratio of the reference voltage $V_{Ref}$ and the desired output voltage $V_{OUT}$ and can be expressed as follows:

$$i\ A_f = V_{Ref}/V_{OUT} \quad (2)$$

When the expression for the feedback factor $A_f$ in equation (2) is substituted in equation (1), the loop gain becomes:

$$A_{loop} = V_{Ref} A_{VEA} V_{IN}/V_{OUT} \quad (3)$$

As can be observed from equation (3) above, the loop gain $A_{loop}$ is dependent on both the input voltage $V_{IN}$ and the output voltage $V_{OUT}$. If the regulator is compensated for stable operation at the highest gain condition, namely the highest value of $V_{IN}$ to $V_{OUT}$, then for every other combination of input and output voltages, the regulator will be overcompensated and sluggish in operation.

One solution to the voltage dependency problem of the loop gain is to make the ramp voltage $V_{Ramp}$ of the PWM comparator of the switching regulator proportional to the input voltage. However, such solution only cancels out the input voltage dependency and the loop gain still varies with the output voltage.

Therefore, it is desirable to provide a switching regulator having constant bandwidth whereby the loop gain is independent of both the input and the output voltages.

SUMMARY OF THE INVENTION

According to one embodiment of the present invention, a switching regulator includes a compensation circuit for applying a scaling factor to the loop gain of the feedback control loop of the regulator. In operation, the loop gain of the feedback control loop has a dependency on the input and output voltages of the switching regulator. The compensation circuit applies a function as the scaling factor where the function is a reciprocal function of the loop gain dependency on the input voltage and output voltage. In one embodiment, the loop gain has a dependency on the ratio $V_{IN}/V_{OUT}$ and a scaling factor having a value indicative of the ratio $V_{OUT}/V_{IN}$ is applied by the compensation circuit.

According to another embodiment of the present invention, a switching regulator receiving an input voltage and generating an output voltage having substantially constant magnitude includes an error amplifier, a control circuit and a compensation circuit. The error amplifier has a first input node coupled to receive a first voltage corresponding to the output voltage, a second input node coupled to a reference voltage and an output node providing an error voltage indicative of the difference between the first voltage and the reference voltage. The control circuit includes an input node receiving the error voltage and an output node generating a first switch control signal and a second switch control signal. The first and second switch control signals drive a first switch and a second switch respectively for generating a signal for generating the output voltage. The error amplifier and the control circuit form a feedback control loop having a first loop gain for maintaining the output voltage at a substantially constant magnitude.

Finally, the compensation circuit is disposed in the feedback control loop whereby the compensation circuit applies a scaling factor to the first loop gain. In operation, the first loop gain of the feedback control loop includes a first function defining the loop gain dependency on the input voltage and the output voltage. The compensation circuit applies a second function as the scaling factor wherein the second function is a reciprocal function of the first function.

In one embodiment, the compensation circuit is coupled in series with the output circuit of the error amplifier. In another embodiment, the compensation circuit is coupled to circuitry within the error amplifier.

According to another embodiment of the present invention, the first loop gain includes a first function defined by the ratio of the input voltage to the output voltage, and the second function is indicative of a ratio of the output voltage to the input voltage.

The present invention is better understood upon consideration of the detailed description below and the accompanying drawings.

BRIEF DESCRIPTION OF THE DRAWINGS

FIG. 1 is a simplified functional diagram of a switching regulator.

FIG. 2 is a functional diagram of a voltage mode buck switching regulator incorporating a compensation circuit according to one embodiment of the present invention.

DETAILED DESCRIPTION OF THE PREFERRED EMBODIMENTS

Figure 3:
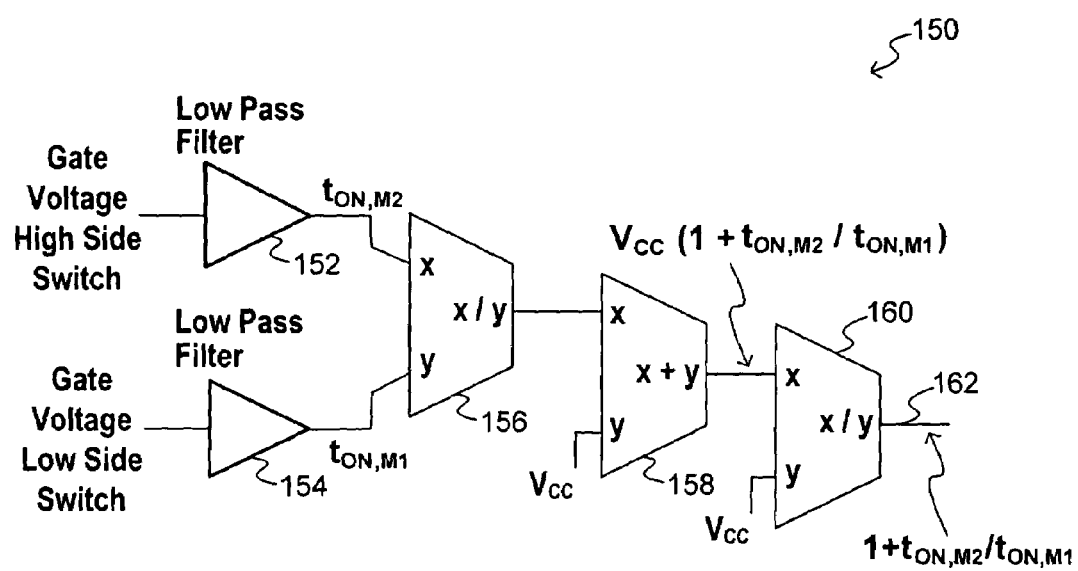
FIG. 3 is a schematic diagram of a compensation circuit which can be used to apply the scaling factor (1+tON,M2/tON,M1) for the switching regulator of FIG. 2 and is applicable whether the switching regulator is operated in the discontinuous conduction mode or the continuous conduction mode.

In accordance with the principles of the present invention, a switching regulator includes a compensation circuit operating to eliminate the loop gain dependency on the input and output voltages of the switching regulator. Specifically, a reciprocal function for the loop gain dependency on the input voltage and output voltage is derived for the specific switching regulator and the reciprocal function is applied to the feedback control loop of the switching regulator to nullify loop gain variations due to the input and output voltages. In this manner, a switching regulator is made to be independent of both the input and output voltages and a constant bandwidth of operation is realized.

The compensation circuit of the present invention can be incorporated in a variety of switching regulator topologies. For instance, the compensation circuit can be incorporated in a buck regulator, a boost regulator or a buck-boost regulator. The compensation circuit can also be applied to switching regulators implementing voltage or current mode control. Regardless of the topology of the switching regulator, the compensation scheme in accordance with the present invention computes the loop gain dependency on the input and output voltages for the particular switching regulator and applies a reciprocal function of the loop gain dependency to the feedback control loop of the switching regulator for compensation. In effect, the compensation scheme scales the loop gain by applying a scaling factor defined by the reciprocal function to the feedback control loop of the switching regulator.

FIG. 2 is a functional diagram of a voltage mode buck switching regulator incorporating a compensation circuit according to one embodiment of the present invention. Referring to FIG. 2, switching regulator 100 includes a voltage control loop formed by dividing down the output voltage $V_{OUT}$ to provide a feedback voltage $V_{FB}$ and feeding back the feedback voltage to an error amplifier 102. The error voltage generated by error amplifier 102 is indicative of the difference between the feedback voltage and a reference voltage $V_{Ref}$ and is coupled to a PWM comparator 106. PWM comparator 106 compares the error voltage with a ramp voltage $V_{Ramp}$ to generate the PWM output voltage $V_{PWM}$ which output voltage is coupled to a driver circuit 108 for generating the switch control signals for a low-side switch M1 and a high-side switch M2. In the present description, PWM comparator 106 and driver circuit 108 are sometimes referred to collectively as a control circuit for switching regulator 100 which control circuit generates the switch control signals for the high-side and low-side switches. To ensure stability, a frequency compensation circuit 110 providing frequency compensation is coupled to a point in the feedback loop of the switching regulator, such as at the output terminal of error amplifier 102. Frequency compensation circuit 110 is often a resistive and capacitive circuit for introducing poles and zeroes to the feedback loop at desired frequencies.

For the voltage-mode buck regulator shown in FIG. 2, the loop gain is given by:

$$A_{loop} = V_{Ref} A_{VEA} V_{IN} / V_{OUT} \quad (4)$$

where $A_{VEA}$ is the gain of error amplifier 102. As shown in equation (4), the loop gain $A_{loop}$ of switching regulator 100 has a dependency on the ratio of the input voltage $V_{IN}$ to the output voltage $V_{OUT}$ of the switching regulator. To implement compensation, a reciprocal function for the ratio $V_{IN}/V_{OUT}$ is derived and applied to the feedback loop of the switching regulator.

Assume that in the present embodiment, switching regulator 100 is operating in the continuous conduction mode. That is, the high-side switch M2 and the low-side switch M1 are turned on alternately to increase or decrease the inductor current through inductor L. Switches M1 and M2 are never turned off simultaneously while the switching regulator is in operation. As will be described in more detail below, switching regulator 100 can also be operated in a discontinuous mode where under certain operating conditions, high-side switch M2 and low-side switch M1 can be turned off at the same time.

In a PWM controlled switching regulator, the output voltage $V_{OUT}$ of the switching regulator is regulated by controlling the duty cycle (or by varying the pulse width) of the rectangular switch voltage $V_{SW}$ applied to the inductor and the capacitor of the output filter circuit. Thus, when the switching regulator is operated in the continuous conduction mode, the ratio of the output voltage $V_{OUT}$ to the input voltage $V_{IN}$ is the duty cycle "D" of the switching regulator.

In the present description, "duty cycle" is defined as the percentage of time a switching device is turned on to cause the inductor current to increase. In general, if the load voltage $V_{OUT}$ is too low, the feedback control system increases the duty cycle so as to increase the amount of energy provided to the inductor. If the load voltage is too high, the feedback control system decreases the duty cycle so as to decrease the amount of energy provided to the inductor. Thus, the duty cycle of switching regulator 100 is also equivalent to the amount of time within a system clock cycle the high-side switch M2 is turned on to increase the current in the inductor L.

It follows that the function $V_{OUT}/V_{IN}$ of switching regulator 100 can be expressed as:

$$V_{out}/V_{in} = D = t_{ON,M2}/T_{cycle} \quad (5)$$

where D is the duty cycle of switching regulator 100, $t_{ON,M2}$ is the on time of high-side switch M2 and $T_{cycle}$ is the system clock frequency or the system clock cycle time of the switching regulator. In the continuous mode, the system clock frequency is set by the frequency of the PWM ramp voltage $V_{Ramp}$. The function $V_{OUT}/V_{IN}$ is an inverse to the function $V_{IN}/V_{OUT}$ and can be applied to the control loop of switching regulator 100 for compensating for the loop gain variations due to the input and output voltages.

In accordance with the present invention, when switching regulator 100 is operated in the continuous conduction mode, the loop gain of the regulator is scaled by the factor $t_{ON,M2}/T_{cycle}$. A compensation circuit (not shown) implementing the function $t_{ON,M2}/T_{cycle}$ can be incorporated in the feedback control loop of switching regulator 100 for scaling the loop gain of the feedback control loop of the switching regulator. In one embodiment, the compensation circuit is connected in series with the output circuitry of error amplifier 102. In operation, the compensation circuit applies a scaling factor to the loop gain so that the loop gain of switching regulator 100 becomes:

$$A_{loop} = V_{ref} A_{VEA} V_{in}/V_{out} * (t_{ON,M2}/T_{cycle}) \quad (6)$$

As shown in equation (6), by incorporating a compensation circuit of the present invention to apply a reciprocal function to the ratio $V_{IN}/V_{OUT}$, loop gain variations in switching regulator 100 due to the input and output voltages can be nullified. In one embodiment, the compensation circuit is implemented by averaging the output voltage $V_{PWM}$ of PWM comparator 106, assuming that the amplitude of output voltage $V_{PWM}$ is not dependent on input voltage $V_{IN}$. In most switching regulator topologies, the PWM comparator and the error amplifier are powered by an internally regulated power supply. Therefore, the amplitude of output voltage $V_{PWM}$ is not a function of input voltage $V_{IN}$ and the average amplitude can be used to measure the duty cycle of the switching regulator. In another embodiment, the compensation circuit is implemented by averaging the switch control signal for the high-side switch M2. The average of the switch control signal for switch M2 is indicative of the on-time of the switch and thus the duty cycle of the switching regulator.

In an alternate embodiment of the present invention, the compensation circuit can be subsumed into the circuitry of error amplifier 102. That is, the scaling factor $t_{ON,M2}/T_{cycle}$ can be provided within the error amplifier circuitry instead of being in series with the output circuitry of the error amplifier. One of ordinary skill in the art, upon being apprised of the present invention, would know how to incorporate a gain scaling factor in the circuitry of an error amplifier.

By applying the compensation scheme of the present invention, the DC gain of the switching regulator can be modified to be independent of the operating point of the switching regulator. That is, the switching regulator can have a DC gain that is independent of the input voltage and the output voltage. As a result, the switching regulator can achieve a near constant unity gain frequency.

In other words, when the compensation scheme of the present invention is applied in a switching regulator, the transient response of the switching regulator can be made substantially independent of the input and output voltages. The switching regulator implementing the compensation scheme of the present invention can be readily applied in any circuit applications because the DC gain is independent of the operating point. Furthermore, line regulation of the switching regulator is improved.

In the above description, switching regulator 100 is assumed to be operated in the continuous conduction mode. In the continuous mode, one of the high-side and low-side switches is always turned on and the inductor current never goes to zero. In other embodiments, switching regulator 100 may be operated in a discontinuous conduction mode where both the high-side switch M2 and the low-side switch M1 are turned off at the same time. Thus, the current in the inductor L can go to zero during some portion of the cycle.

In the continuous mode, either one of the high-side or low-side switch is always turned on. Thus, the sum of the switches' on-times is the system cycle time given as follows:

$$t_{on,m1} + t_{on,m2} = T_{cycle} \quad (7)$$

However, in the discontinuous mode, the sum of the switches' on-times can be smaller than the system cycle time given as follows:

$$t_{on,m1} + t_{on,m2} <= T_{cycle} \quad (8)$$

In practice, the continuous mode can be treated as a limit case of the discontinuous mode where the switches are in fact never turned off and the sum of the switch on-times is the system cycle time.

In an alternate embodiment of the present invention, switching regulator 100 is operated in a discontinuous conduction mode and the output to input voltage ratio is given as follows:

$$V_{out}/V_{in} = 1 + t_{ON,M2}/t_{ON,M1} \quad (9)$$

The $V_{out}/V_{in}$ relationship expressed in equation (9) can be used as a reciprocal function for correcting for the input/output voltage dependency of the loop gain in switching regulator 100.

Thus, in accordance with the present invention, by applying a scaling factor of $(1+t_{ON,M2}/t_{ON,M1})$ to the loop gain $A_{loop}$ of switching regulator 100 (equation (4)), the loop gain dependency on the input and output voltages can be eliminated and switching regulator 100 can operate with a constant bandwidth.

In one embodiment, the scaling factor $(1+t_{ON,M2}/t_{ON,M1})$ is implemented in a compensation circuit and the compensation circuit is coupled in series with the output circuitry of error amplifier 102. In another embodiment, the compensation circuit is subsumed in error amplifier 102.

FIG. 3 is a schematic diagram of a compensation circuit which can be used to apply the scaling factor (1+tON,M2/tON,M1) for switching regulator 100. The compensation circuit of FIG. 3 is applicable whether the switching regulator is operated in the discontinuous conduction mode or the continuous conduction mode. Referring to FIG. 3, compensation circuit 150 includes a first low pass filter 152 coupled to receive and filter the gate voltage for high-side switch M2. The gate voltage of high-side switch M2 is indicative of the high-side switch control signal generated by the control circuit of switching regulator 100. Compensation circuit 150 also includes a second low pass filter 154 coupled to receive and filter the gate voltage for low-side switch M1. The gate voltage of low-side switch M1 is indicative of the low-side switch control signal generated by the control circuit in switching regulator 100. The filtered gate voltage signals are indicative of the on-times of the high-side and low-side switches. The filtered signals $t_{ON,M1}$ and $t_{ON,M2}$ are coupled to a divider circuit 156 for generating the ratio $t_{ON,M2}/t_{ON,M1}$. Then, the ratio is coupled to a summing circuit 158 for adding a Vcc voltage value to the ratio. The output of summing circuit 158 is given as:

$$Vcc(1+t_{ON,M2}/t_{ON,M1}) \quad (10)$$

To remove the Vcc multiplier factor from equation (10), the output of summing circuit 158 is coupled to a divider circuit 160 which divides the sum in equation (10) by the voltage value Vcc. The output of divider 160 on terminal 162 is the scaling factor $(1+t_{ON,M2}/t_{ON,M}1)$. Compensation circuit 150 can be coupled in series with the output circuitry of error amplifier 102 to apply the scaling factor to the loop gain $A_{loop}$ of the switching regulator. Compensation circuit 150 can also be coupled to circuitry within error amplifier 102 to apply the scaling factor at the error amplifier.

Note that equation (9) can be applied to the continuous mode operation as well. Basically, by substituting the term: $t_{ON,M1} = T_{cycle} - t_{ON,M2}$ in equation (9), equation (5) is obtained. Thus, compensation circuit 150 can be used to provide compensation in a voltage mode buck switching regulator operating in either the continuous or discontinuous mode.

As discussed above, the compensation scheme of the present invention can be applied to other switching regulator topologies, such as a boost or a buck-boost regulator. The above description is illustrative only. For other switching regulator topologies, the compensation scheme of the present invention can be implemented by deriving a reciprocal function for the loop gain dependency on the input voltage and the output voltage and applying the reciprocal function to the feedback control loop of the switching regulator. In this manner, the loop gain variations due to the input/output voltage are nullified and the switching regulator can be operated with constant bandwidth.

The above detailed descriptions are provided to illustrate specific embodiments of the present invention and are not intended to be limiting. Numerous modifications and variations within the scope of the present invention are possible. The present invention is defined by the appended claims.

We claim:

1. A switching regulator for receiving an input voltage and generating an output voltage having substantially constant magnitude, the switching regulator comprising:
   an error amplifier having a first input node coupled to receive a first voltage corresponding to the output voltage, a second input node coupled to a reference voltage and an output node providing an error voltage indicative of the difference between the first voltage and the reference voltage;
   a control circuit comprising an input node receiving the error voltage and an output node generating a first switch control signal and a second switch control signal, the first and second switch control signals driving a first switch and a second switch respectively for generating a signal for generating the output voltage, wherein the error amplifier and the control circuit form a feedback control loop having a first loop gain for maintaining the output voltage at a substantially constant magnitude; and
   a compensation circuit disposed in the feedback control loop, the compensation circuit applying a scaling factor to the first loop gain,
   wherein the first loop gain of the feedback control loop is defined by a first function describing a the loop gain dependency on the input voltage and the output voltage, and the compensation circuit applies a second function describing the scaling factor wherein the second function is a reciprocal function of the first function.

2. The switching regulator of claim 1, wherein the error amplifier comprises an output circuit and the compensation circuit is coupled in series with the output circuit of the error amplifier.

3. The switching regulator of claim 1, wherein the compensation circuit is coupled to circuitry within the error amplifier.

4. The switching regulator of claim 1, wherein the first loop gain is defined by a first function being the ratio of the input voltage to the output voltage, and the second function is indicative of a ratio of the output voltage to the input voltage.

5. The switching regulator of claim 4, wherein the control circuit comprises a PWM comparator receiving the error voltage and a ramp voltage as input signal and generating a PWM output voltage, and a driver circuit coupled to receive the PWM output voltage and generating the first and second switch control signals, and wherein the scaling factor described by the second function comprises the average of the PWM output voltage.

6. The switching regulator of claim 4, wherein the first switch and the second switch are coupled to drive a switch output node, the first switch being turned on to decrease the current provided to the switch output node and the second switch being turned on to increase the current provided to the switch output node.

7. The switching regulator of claim 6, wherein the scaling factor described by the second function comprises the duty cycle of the switching regulator.

8. The switching regulator of claim 6, wherein the scaling factor described by the second function comprises an average of second switch control signal driving the second switch.

9. The switching regulator of claim 6, wherein the switching regulator comprises a voltage mode buck regulator and the first loop gain is given as $V_{Ref}A_{VEA}V_{IN}/V_{OUT}$, where $V_{Ref}$ is the reference voltage, $A_{VEA}$ is the gain of the error amplifier, $V_{IN}$ is the input voltage, and $V_{OUT}$ is the output voltage, and wherein the second function is given as $(1+t_{ON,M2}/t_{ON,M1})$ which is equivalent to $V_{OUT}/V_{IN}$, where $t_{ON,M2}$ represents the on-time of the second switch and $t_{ON,M1}$ represents the on-time of the first switch.

10. The switching regulator of claim 9, wherein the switching regulator is being operated in a continuous conduction mode and the second function is given as $(t_{ON,M2}/T_{cycle})$ which is equivalent to $V_{OUT}/V_{IN}$, wherein $T_{cycle}$ is the system clock cycle time of the switching regulator.

11. The switching regulator of claim 9, wherein the compensation circuit comprises:
   a first low pass filter for filtering the first switch control signal;
   a second low pass filter for filtering the second switch control signal;
   a first divider circuit coupled to receive the filtered first switch control signal and the filtered second switch control signal and generate a first divider output signal indicative of the ratio of the filtered first switch control signal to the filtered second switch control signal;
   a summing circuit coupled to sum the first divider output signal with a second voltage and generating a summed output voltage; and
   a second divider circuit coupled to receive the summed output voltage and the second voltage and generate a second divider output signal indicative of the ratio of the summed output voltage to the second voltage,
   wherein the second divider output signal has a value of $(1+t_{ON,M2}/t_{ON,M1})$.

12. The switching regulator of claim 11, wherein the second voltage comprises a power supply voltage of the error amplifier and the control circuit.

13. A method for providing compensation in a switching regulator receiving an input voltage and generating an output voltage having substantially constant magnitude, comprising:
   determining a loop gain of a feedback control loop in the switching regulator;
   determining a first function describing the loop gain dependency on the input voltage and the output voltage;
   determining a second function being a reciprocal of the first function; and
   applying the second function to a point in the feedback control loop of the switching regulator.

14. The method of claim 13, wherein applying the second function to a point in the feedback control loop of the switching regulator comprises applying a scaling factor described by the second function to scale the loop gain of the feedback control loop.

15. The method of claim 13, wherein applying the second function to a point in the feedback control loop of the switching regulator eliminates the loop gain dependency on the input voltage and the output voltage.

16. The method of claim 13, wherein the switching regulator comprises an error amplifier in the feedback control loop, the error amplifier being coupled to compare a voltage indicative of the output voltage and a reference voltage and generate an error output voltage, and wherein applying the second function to a point in the feedback control loop of the switching regulator comprises providing a circuit implementing the second function and coupling the circuit implementing the second function in series an output circuit of the error amplifier.

17. The method of claim 13, wherein the switching regulator comprises an error amplifier in the feedback control loop, the error amplifier coupled to compare a voltage indicative of the output voltage to a reference voltage and generate an error output voltage, and wherein applying the second function to a point in the feedback control loop of the switching regulator comprises providing a circuit implementing the second function and coupling the circuit implementing the second function to circuitry within the error amplifier.

18. The method of claim 13, wherein the first function is defined by the ratio of the input voltage to the output voltage, and the second function is indicative of a ratio of the output voltage to the input voltage.

19. The method of claim 18, wherein the switching regulator comprises a first switch and a second switch driving a switch output node, the first switch being turned on to decrease the current provided to the switch output node and the second switch being turned on to increase the current provided to the switch output node, the first switch being controlled by a first switch control signal and the second switch being controlled by a second switch control signal, and the switching regulator further comprises an error amplifier in the feedback control loop, the error amplifier coupled to compare a voltage indicative of the output voltage to a reference voltage and generate an error output voltage.

20. The method of claim 19, wherein the switching regulator comprises a voltage mode buck regulator and the loop gain is given as $V_{Ref} A_{VEA} V_{IN}/V_{OUT}$, where $V_{Ref}$ is the reference voltage, $A_{VEA}$ is the gain of the error amplifier, $V_{IN}$ is the input voltage, and $V_{OUT}$ is the output voltage, and wherein the second function is given as $(1+t_{ON,M2}/t_{ON,M1})$ which is equivalent to $V_{OUT}/V_{IN}$, where $t_{ON,M2}$ represents the on-time of the second switch and $t_{ON,M1}$ represents the on-time of the first switch.

21. The method of claim 20, wherein the switching regulator is being operated in a continuous conduction mode and the second function is given as $(t_{ON,M2}/T_{cycle})$ which is equivalent to $V_{OUT}/V_{IN}$, wherein $T_{cycle}$ is the system clock cycle time of the switching regulator.

* * * * *